US011644592B2

(12) United States Patent
Gao et al.

(10) Patent No.: US 11,644,592 B2
(45) Date of Patent: May 9, 2023

(54) SEISMIC TIME-FREQUENCY ANALYSIS METHOD BASED ON GENERALIZED CHIRPLET TRANSFORM WITH TIME-SYNCHRONIZED EXTRACTION

(71) Applicant: Xi'an Jiaotong University, Xi'an (CN)

(72) Inventors: Jinghuai Gao, Xi'an (CN); Zhen Li, Xi'an (CN); Naihao Liu, Xi'an (CN)

( * ) Notice: Subject to any disclaimer, the term of this patent is extended or adjusted under 35 U.S.C. 154(b) by 0 days.

(21) Appl. No.: 17/358,405

(22) Filed: Jun. 25, 2021

(65) Prior Publication Data
US 2021/0333425 A1    Oct. 28, 2021

(30) Foreign Application Priority Data

Apr. 28, 2020  (CN) .......................... 202010351016.2

(51) Int. Cl.
*G01V 1/30*    (2006.01)
*G01V 1/32*    (2006.01)

(52) U.S. Cl.
CPC .............. *G01V 1/307* (2013.01); *G01V 1/325* (2013.01); *G01V 2210/48* (2013.01); *G01V 2210/63* (2013.01)

(58) Field of Classification Search
CPC .... G01V 1/307; G01V 1/325; G01V 2210/48; G01V 2210/63
See application file for complete search history.

(56) References Cited

U.S. PATENT DOCUMENTS

| 9,310,502 | B2 * | 4/2016 | Ozdemir | G01V 1/28 |
| 11,215,727 | B2 * | 1/2022 | Wu | G01V 1/201 |
| 2010/0211320 | A1 * | 8/2010 | Vassallo | G01V 1/38 |
| | | | | 702/14 |

(Continued)

FOREIGN PATENT DOCUMENTS

| CN | 109034043 A | 2/2018 |
| CN | 109117832 A | 6/2018 |

(Continued)

OTHER PUBLICATIONS

Barriere et al. An advanced signal processing technique for deriving grain size information of bed loaded transport from impact plate vibration measurements (Year: 2014).*

(Continued)

*Primary Examiner* — Mohammad K Islam
(74) *Attorney, Agent, or Firm* — Novoclaims Patent Services LLC; Mei Lin Wong

(57) ABSTRACT

A seismic time-frequency analysis method based on generalized Chirplet transform with time-synchronized extraction, which has higher level of energy aggregation in the time direction and can better describe and characterize the local characteristics of seismic signals, and is applicable to the time-frequency characteristic representation of both harmonic signals and pulse signals, comprising the steps of processing generalized Chirplet transform with time-synchronized extraction for each seismic signal to obtain a time spectrum by: carrying out generalized Chirplet transform, calculating group delay operator and carrying out time-synchronized extraction on seismic signals, thereby the boundary and heterogeneity structure of the rock slice are more accurately and clearly shown and subsequence seismic analysis and interpretation are facilitated.

2 Claims, 4 Drawing Sheets

(56) References Cited

U.S. PATENT DOCUMENTS

| | | | |
|---|---|---|---|
| 2010/0211322 A1* | 8/2010 | Vassallo | G01V 1/364 702/14 |
| 2010/0211323 A1* | 8/2010 | Ozdemir | G01V 1/36 702/14 |
| 2011/0249594 A1* | 10/2011 | Wu | G01S 5/06 370/255 |
| 2019/0137640 A1* | 5/2019 | Park | G01S 15/88 |
| 2020/0096661 A1 | 3/2020 | Ltd. | |

FOREIGN PATENT DOCUMENTS

| | | |
|---|---|---|
| GN | 108694392 A | 12/2017 |
| GN | 107632320 A | 1/2018 |

OTHER PUBLICATIONS

Huang et al., Spectral decomposition using general linear chirplet transform (Year: 2017).*

Touze et al., Microseismic wavefield separation using multi-channel chirplet decomposition (Year: 2009).*

Gang Yu, Yiqi Zhou, "General linear chirplet transform", Mechanical Systems and Signal Processing, 70-71 (2016) 958-973, Sep. 26, 2015, relevant p. p. 961-962.

Gang Yu, "A Concentrated Time-Frequency Analysis Tool for Bearing Fault Diagnosis", IEEE Transactions On Nstrumentation and Measurement, vol. 69, No. 2, p. 371-381, Feb. 2020, relevant p. p. 373.

\* cited by examiner (a)

(b)

(a)

(b)

(a)

(b)

(c)

SEISMIC TIME-FREQUENCY ANALYSIS METHOD BASED ON GENERALIZED CHIRPLET TRANSFORM WITH TIME-SYNCHRONIZED EXTRACTION

CROSS REFERENCE OF RELATED APPLICATION

This is a non-provisional application which claimed priority of Chinese application number 202010351016.2, filing date Apr. 28, 2020. The contents of these specifications, including any intervening amendments thereto, are incorporated herein by reference.

BACKGROUND OF THE PRESENT INVENTION

Field of Invention

The present invention relates to seismic exploration, and particularly relates to a seismic time-frequency analysis method based on time-synchronized extraction with generalized Chirplet (Linear frequency modulation wavelet) transform.

BACKGROUND OF THE INVENTION

Description of Related Arts

Time-frequency analysis can characterize the frequency distribution and changes of seismic signals and other non-stationary signals over time such that useful information for seismic data processing and interpretation can be obtained. Improving the time-frequency resolution is helpful to accurately portray the fine stratum structure, which is very important for detecting and portraying reservoir information such as river channels. With the increasing difficulty of exploration and development, higher and higher requirements are put forward for the accuracy and time-frequency resolution of time-frequency analysis. Traditional time-frequency analysis tools, such as short-time Fourier transform and wavelet transform, have their time-frequency resolution limited by the uncertainty principle, and they have certain limitations when describing non-stationary signals such as seismic signals. For example, once the window length of the window function of the short-time Fourier transform is selected, its time-frequency resolution is also fixed. The time resolution of wavelet transform at low frequencies and the frequency resolution at high frequencies are relatively low.

Traditional time-frequency analysis techniques are limited by the uncertainty principle, and the time resolution and frequency resolution cannot be optimized at the same time, which often leads to the spread of the energy of the time spectrum. Some advanced time-frequency analysis techniques, such as synchronous extrusion transformation and demodulation of synchronous extrusion transformation, can improve the energy concentration in the frequency direction of the time spectrum. However, in practical applications, especially in seismic time-frequency analysis, sometimes better energy accumulation in the time direction is required.

SUMMARY OF THE PRESENT INVENTION

In order to overcome the problems of the conventional arts, an object of the present invention is to provide a seismic time-frequency analysis method based on time-synchronized extraction of generalized Chirplet transform, which has higher level of energy aggregation in the time direction and can better describe and characterize the local characteristics of seismic signals, and is applicable to the time-frequency characteristic representation of both harmonic signals and pulse signals.

Additional advantages and features of the invention will become apparent from the description which follows, and may be realized by means of the instrumentalities and combinations particular point out in the appended claims.

According to the present invention, the foregoing and other objects and advantages are attained by a seismic time-frequency analysis method based on time-synchronized extraction of generalized Chirplet transform, which comprises the following steps of:

(a) suppose a set of 3D seismic data is S(T,M,N), where T is the duration of time, M is the total number of line numbers, and N is the total number of track numbers;

(b) Calculate the average Fourier spectrum of several seismic signals from the seismic data, and select the constant frequency value $\eta_0$ to be extracted;

(c) Process time-synchronized extraction of generalized Chirplet transform for each seismic signal f(t)=S(T,m,n) of the 3D seismic data S(T,M,N) to obtain the time spectrum $TGC_f(\eta,t)$, where $1 \leq m \leq M$; $1 \leq n \leq N$, let $S_{TF}(T,m,n)=TGC_f(\eta_0,T)$; and (d) Obtain the constant frequency data volume as $S_{TF}(T,M,N)$, and process subsequent processing and interpretation of the rock slices according to the requirements.

Preferably, in step (b), draw the time spectrum, observe the main frequency interval of the signal, and select the frequency value to be extracted in this main frequency interval.

Preferably, in step (c), to obtain the time spectrum of each seismic signal, the time-synchronized extraction of generalized Chirplet transform is processed by three operations: carrying out generalized Chirplet transform on the signal, calculation of group delay operator and time-synchronized extraction.

Preferably, the generalized Chirplet transform is carrying out on the signal f(t) to obtain the time-frequency representation $GC_f(\eta,t)$, whose expression is as follow:

$$GC_f(\eta, t) = \int_R f(\tau)g(\tau - t)e^{-i\frac{\hat{c}(t)}{2}(\tau-t)^2} e^{-i\eta\tau} d\tau$$

where R represents the set of real numbers, i represents an imaginary unit, g(t) is the window function, ĉ(t) is the optimized Chirp rate, $\eta$ is the frequency variable, $\tau$ is the integral time variable, and t is the time variable.

Preferably, the calculation of the group delay operator is as follow:

$$\hat{t}_f(\eta, t) = -\Im\left\{\frac{\partial_\eta GC_f(\eta, t)}{GC_f(\eta, t)}\right\}$$

where $\Im\{\bullet\}$ refers to the imaginary part, $\partial_\eta(\bullet)$ refers to the partial derivative being find with respect to the frequency variable $\eta$.

Preferably, the time-synchronized extraction is calculated as follows:

$$TGC_f(\eta,t)=GC_f(\eta,t)\delta(t-\hat{t}_f(\eta,t))$$

Where the definition of $\delta(t-\tilde{t}_f(\eta,t))$ is:

$$\delta(t-\tilde{t}_f(\eta,t)) = \begin{cases} 1, & t = \tilde{t}_f(\eta,t) \\ 0, & \text{otherwise} \end{cases} \quad \text{(iv)}$$

The time-frequency coefficient at this point is retained only when the estimated value of the group delay operator is equal to the true value.

Compared with the conventional technologies, the present invention has the following advantageous effects:

The present invention is based on the seismic time-frequency analysis method of time-synchronized extraction of the generalized Chirplet transform, and the group delay estimation operator is introduced into the generalized Chirplet transform for the first time, so that the energy in the time direction of the time spectrum is more concentrated. Compared with time-synchronized extraction short-time Fourier transform, etc., the method of the present invention can be used not only to process slow-changing signals but also to process transient signals. Therefore, the practicability of time-synchronized extraction of the generalized Chirplet transform of the present invention is applicable to time-frequency characteristic representation of both harmonic and pulse signals and its application is more extensive.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
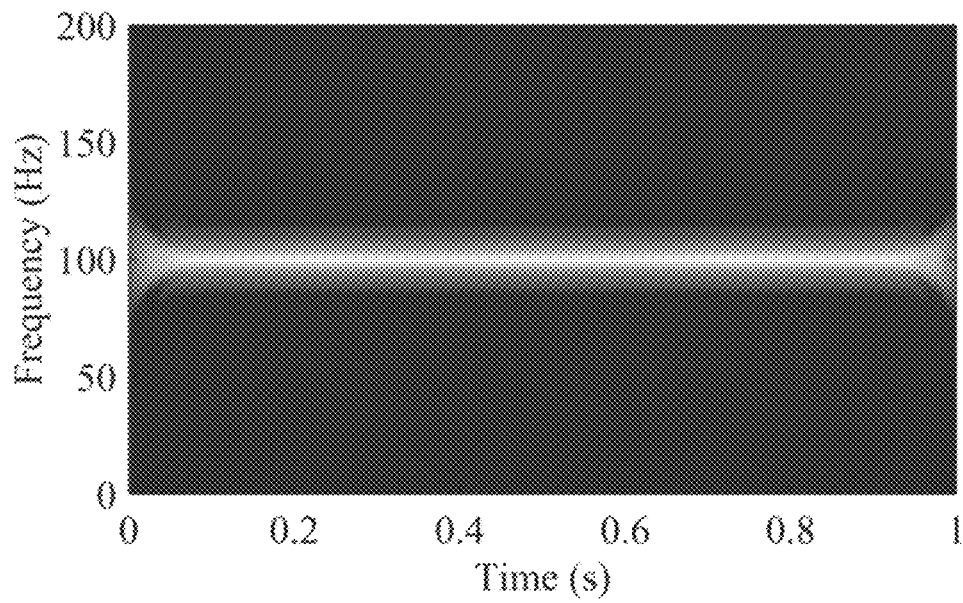
FIG. 1 is a schematic diagram of the time-frequency spectrum of impact signal f(t)=exp[2iπ(100t)] in different methods; wherein (a) is the generalized Chirplet transform; (b) is the generalized Chirplet transform with time-synchronized extraction.
Figure 1:
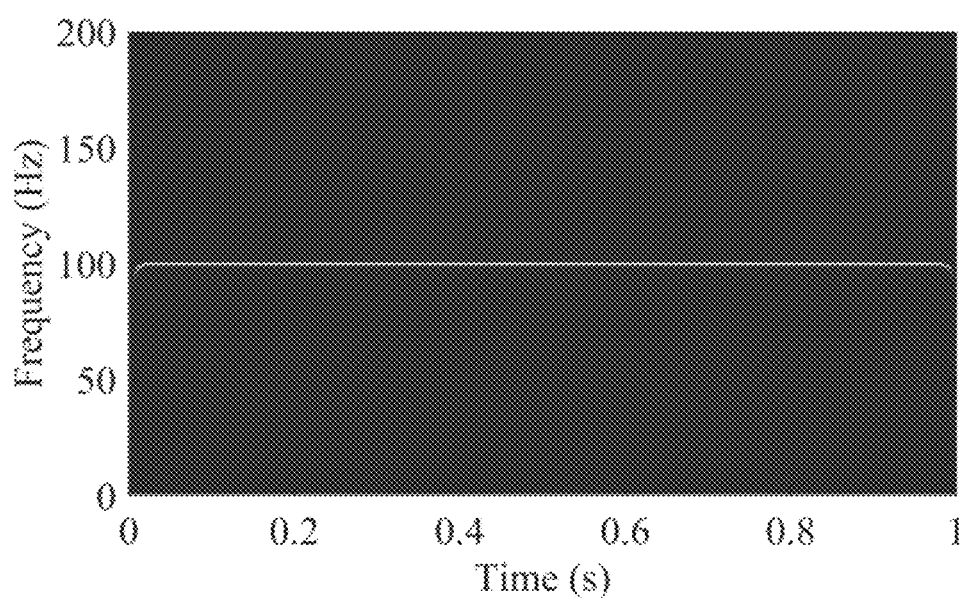

Embodiments of the present invention are described in detail below in connection with the accompanying drawings and embodiments.

It should be noted that the terms "first" and "second" in the description, drawings and claims of the present invention are used to distinguish similar objects, and are not necessarily used to describe a specific order or sequence. It should be understood that the terms used in this way can be interchanged under appropriate circumstances so that the embodiments of the present invention described herein can be implemented in a sequence other than those illustrated or described herein. In addition, the terms "including", "comprising" and "having" and any variations of them are intended to cover non-exclusive inclusions. For example, a process, method, system, product, or device that includes a series of steps or units is not necessarily limited to those identical as listed. Those steps or units may include other steps or units that are not clearly listed or are inherent to these processes, methods, products, or devices.

I. According to the preferred embodiment of the present invention, a seismic time-frequency analysis method based on time-synchronized extraction of generalized Chirplet transform comprises the following steps of:

(1) performing the time-synchronized extraction of generalized Chirplet transform, which comprises the following steps:

(1.1) Carrying out the generalized Chirplet transform on the signal f(t) to obtain the time-frequency representation $GC_f(\eta,t)$, whose expression is as follow:

$$GC_f(\eta,t) = \int_R f(\tau)g(\tau-t)e^{-i\frac{\hat{c}(t)}{2}(\tau-t)^2} e^{-i\eta\tau} d\tau \quad \text{(i)}$$

where R represents the set of real numbers, i represents an imaginary unit, g(t) is the window function, ĉ(t) is the optimized Chirp rate, η is the frequency variable, τ is the (integral) time variable, and t is the integration time variable, then calculating by the following formula to obtain:

$$GS_f(t,\eta) = C_f(t,\eta,\hat{c}_n),$$

here $\hat{c}_n = \arg \max_c |C_f(t,\eta,c_i)|$, $i=1, \ldots, K$ \quad (ii)

where $$C_f(t, \eta, c) = \int_R f(\tau)g(\tau-t)e^{-i\frac{c}{2}(\tau-t)^2} e^{-i\eta\tau} d\tau \quad \text{(iii)}$$

(1.2) calculating the group delay operator $\tilde{t}_f(\eta,t)$:

$$\tilde{t}_f(\eta, t) = -\Im\left\{\frac{\partial_\eta GC_f(\eta,t)}{GC_f(\eta,t)}\right\} \quad \text{(iv)}$$

where $\Im\{\bullet\}$ refers to the imaginary part, $\partial_\eta(\bullet)$ refers to the partial derivative being find with respect to the frequency variable η.

(1.3) calculating the time-synchronized extraction of the time-frequency spectrum of the generalized Chirplet transform:

$$TGC_f(\eta,t) = GC_f(\eta,t)\delta(t-\tilde{t}_f(\eta,t)) \quad \text{(v)}$$

where $\delta(t-\tilde{t}_f(\eta,t))$ is defined as:

$$\delta(t - \tilde{t}_f(\eta, t)) = \begin{cases} 1, & t = \tilde{t}_f(\eta, t) \\ 0, & \text{otherwise} \end{cases} \quad \text{(vi)}$$

For the harmonic signal $f_h(t)=Ae^{i\eta_0 t}$, its generalized Chirplet transform result is:

$$GC_{f_\delta}(\eta, t) = \int_{\mathbb{R}} f_h(\tau)g(\tau - t)e^{-i\frac{\hat{c}(t)}{2}(\tau-t)^2} e^{-i\eta\tau} d\tau = \quad \text{(vii)}$$

$$\int_{\mathbb{R}} Ae^{i\eta_0\tau} g(\tau - t)e^{-i\frac{\hat{c}(t)}{2}(\tau-t)^2} e^{-i\eta\tau} d\tau =$$

$$A\hat{g}(\eta - \eta_0)e^{-i(\eta-\eta_0)t}e^{i\frac{\hat{c}(t)}{2}(\eta-\eta_0)^2}$$

According to formula (iv), the following can be obtained:

$$\tilde{t}_{f_h}(\eta, t) = -\Im\left\{\frac{\partial_\eta GC_{f_h}(\eta, t)}{GC_{f_h}(\eta, t)}\right\} = t + \hat{c}(t)(\eta_0 - \eta) \quad \text{(viii)}$$

From the definition (vi), the following equivalent can be derived:

$$\tilde{t}_{f_h}(\eta,t) = t \Leftrightarrow \hat{c}(t)(\eta_0 - \eta) = 0 \Leftrightarrow \eta = \eta_0 \quad \text{(ix)}$$

FIG. 1 verifies the conclusion of equation (ix). Time-synchronized extraction of generalized Chirplet transform can accurately locate the frequency of harmonic signals.

For the impact signal $f_\delta(t) = A\delta(t-t_0)$, its generalized Chirplet transform obtained is:

$$GS_{f_\delta}(t, \eta) = \quad \text{(x)}$$

$$A\int_{\mathbb{R}} \delta(\tau - t_0)g(\tau - t)e^{-i\frac{\hat{c}(t)}{2}(\tau-t)^2} e^{-i\eta\tau} d\tau = Ag(t_0 - t)e^{-i\frac{\hat{c}(t)}{2}(t_0-t)^2} e^{i\eta t_0}$$

According to formula (iv), the following can be obtained:

$$\tilde{t}_f(t,\eta) = t_0 \quad \text{(xi)}$$

Figure 2:
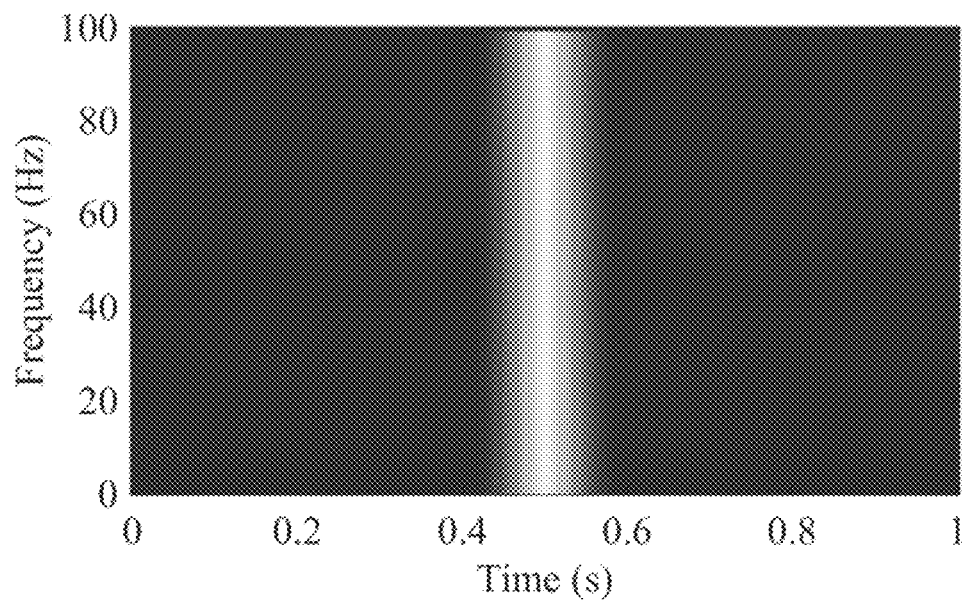
FIG. 2 is a schematic diagram of the time-frequency spectrum of harmonic signal f(t)=4·δ(t−0.5) in different methods; wherein (a) is the generalized Chirplet transform; (b) is the generalized Chirplet transform with time-synchronized extraction.
Figure 2:
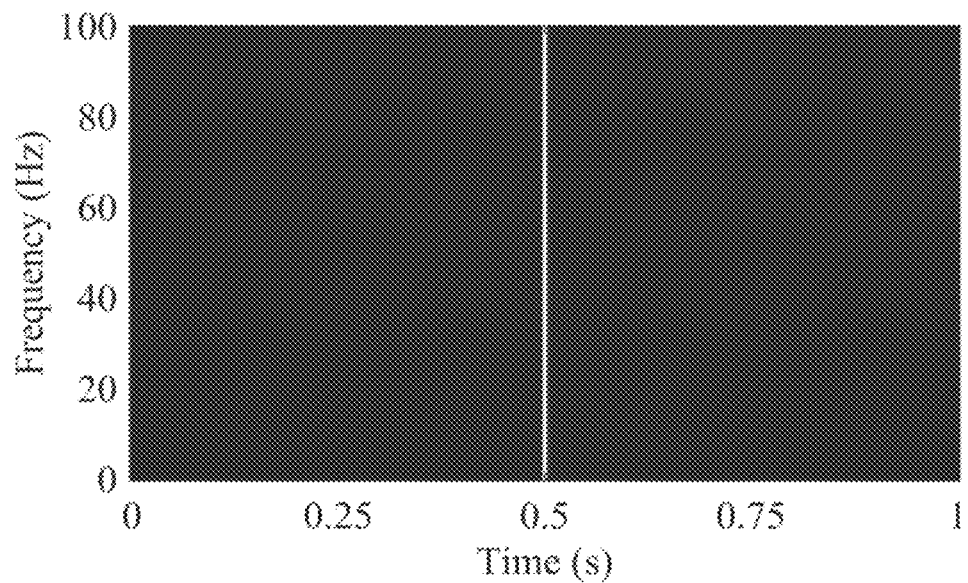

FIG. 2 verifies the conclusion of equation (xi). Time-synchronized extraction of generalized Chirplet transform can accurately locate the time when the impact signal occurs.

2. A seismic time-frequency analysis method based on time-synchronized extraction of generalized Chirplet transform comprises the following steps of:

Suppose a set of 3D seismic data is $S(T,M,N)$, and the constant frequency data volume required to be obtained is $S_{TF}(T,M,N)$.

(2.1) Calculate the average Fourier spectrum of the seismic data, and select the constant frequency value $\eta_0$ (assume the value is 30 Hz) to be extracted;

(2.2) Process time-synchronized extraction of generalized Chirplet transform for each track $S(T,m,n)$ ($1 \leq m \leq M$; $1 \leq n \leq N$) of the 3D seismic data $S(T,M,N)$ to obtain the time spectrum TF, and $S_{TF}(T,m,n)=TGC_f(\eta_0,T)$;

(2.3) Obtain the constant frequency data volume as $S_{TF}(T,M,N)$, and process subsequent processing and interpretation of the rock slices according to the requirements.

II. Numerical simulation results

1. Synthetic model data

In order to verify the effectiveness of generalized Chirplet transform with time-synchronized extraction to improve time-spectrum, energy aggregation, a composite signal is selected, and as shown in FIG. 3(a), the mathematical expression is as follows:

$$f_2(t)=\exp[2i\pi(20t+10\sin(t))] \quad \text{(xii)}$$

Where the sampling time interval is 0.01 s.

Figure 3:
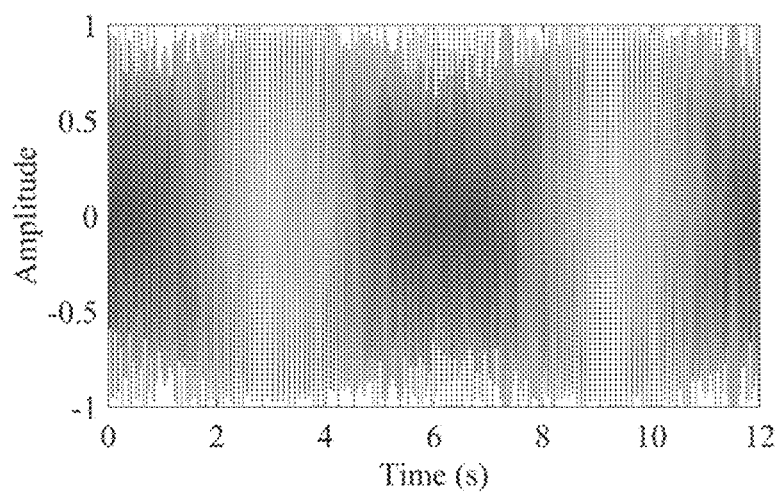
FIG. 3 is a schematic diagram of the time-frequency spectrum of synthetic signal f(t)=exp[2iπ(20t+10 sin(t))] in different methods; wherein (a) is the time-domain waveform of the real part of the signal; (b) is the short-time Fourier transform with time-synchronized extraction; (c) is the generalized Chirplet transform with time-synchronized extraction.
Figure 3:
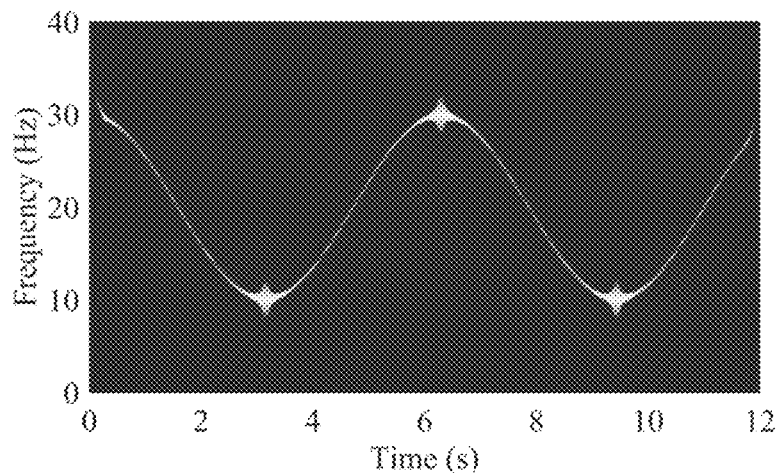
Figure 3:
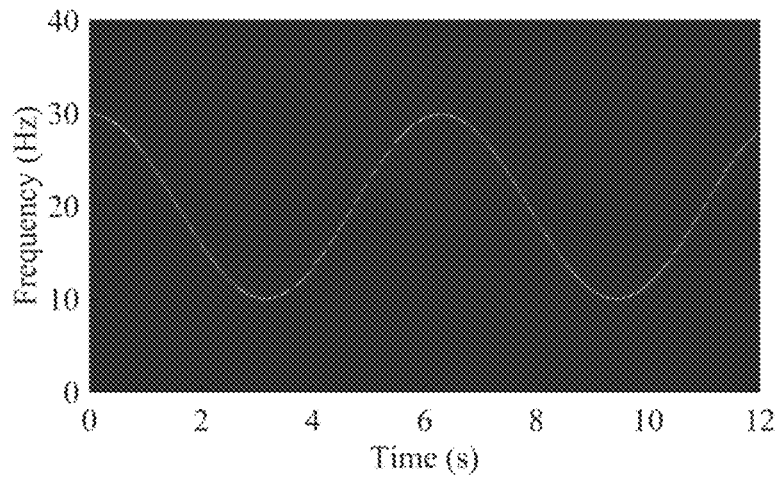

FIG. 3 shows the time-frequency results of the generalized Chirplet transform with time-synchronized extraction and the short-time Fourier transform with time-synchronized extraction. Comparing (b) and (c) of FIG. 3, it is found that the two different time-frequency analysis methods can accurately describe the rhythmic frequency change of the signal at the position of frequency changes with more rapid changes. However, at the position of frequency changes with slower changes, the time-frequency aggregation of the generalized Chirplet transform is better with time-synchronized extraction, making it capable of characterizing the time-frequency characteristics of the signal more accurately.

2. Actual seismic data

Figure 4:
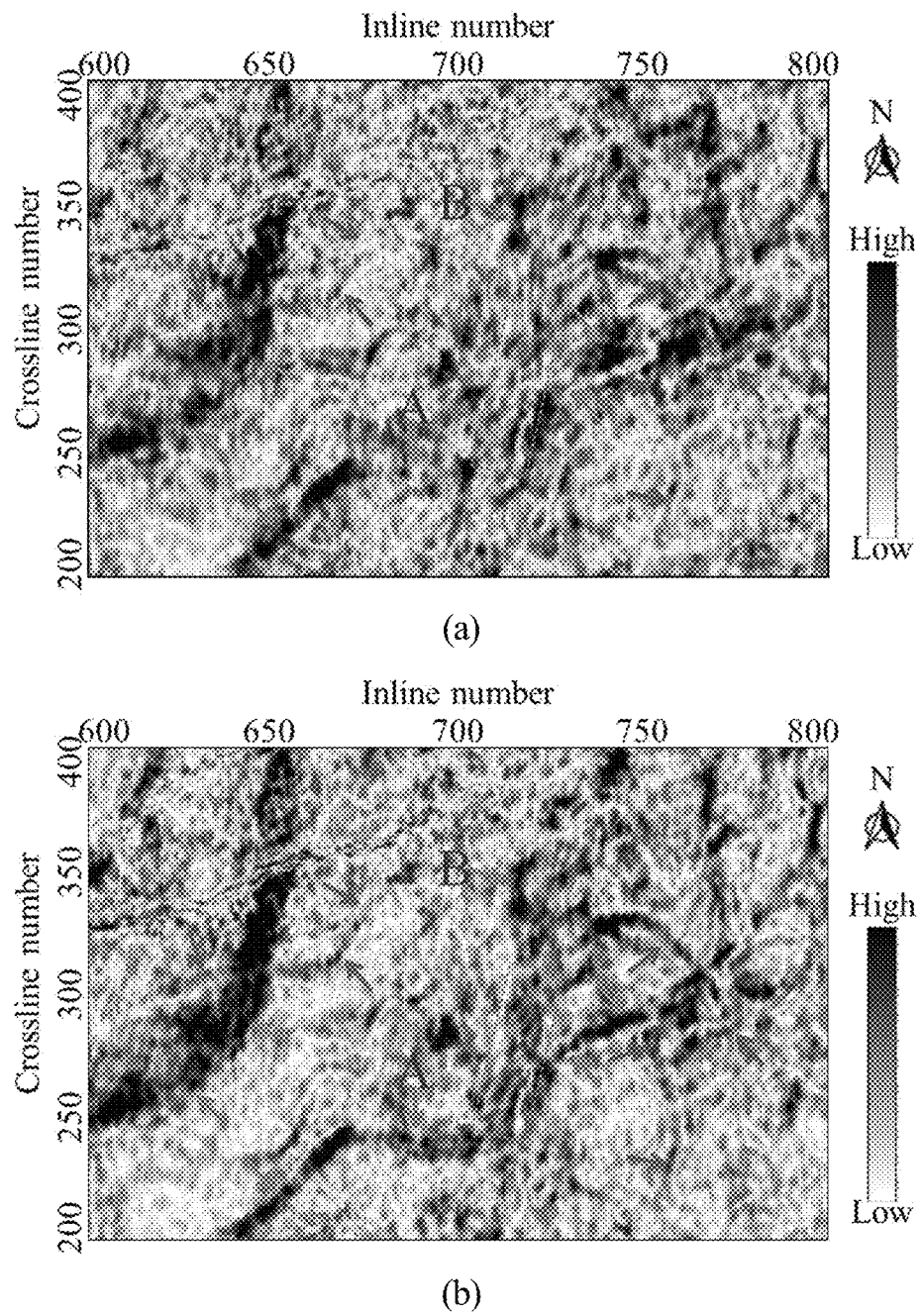
FIG. 4 illustrates the rock slice at 40 Hz of a three-dimensional seismic data volume in an oil field which is processed with different time-frequency techniques, wherein (a) is the short-time Fourier transform with time-synchronized extraction; (b) is the generalized Chirplet transform with time-synchronized extraction.

Based on the theoretical analysis results, the generalized Chirplet transform with time-synchronized extraction is further applied to the seismic time-frequency analysis. FIG. 4 illustrates the results of rock slice at 40 Hz of a three-dimensional seismic data volume in an oil field. Since the generalized Chirplet transform with time-synchronized extraction can provide better time-frequency aggregation than the short-time Fourier transform with time-synchronized extraction, the method of the generalized Chirplet transform with time-synchronized extraction of the present invention can reflect the fine structure of the underground more accurately. As shown in FIG. 4(b), the boundary and heterogeneity structure are much more clearer.

In summary, the method of the present invention introduces the group delay estimation operator to the generalized Chirplet transform for the first time. The method of the present invention performs time-frequency analysis on slow-changing and transient signals and the time-frequency representation of energy aggregation under both slow-changing and transient signal condition can both be obtained, thereby improving the adaptability of analyzed signals. Compared with the short-time Fourier transform with time-synchronized extraction, which is applied to seismic data processing, the present invention can characterize the fine underground structure and its heterogeneity more accurately.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A seismic time-frequency analysis method based on generalized Chirplet transform with time-synchronized extraction for seismic data processing of an underground structure having a plurality of rock structures, comprising the steps, executed by a computer, of:

(I) obtaining 3D seismic data of the underground structure;
(II) performing seismic time-frequency analysis based on generalized Chirplet transform with time-synchronized extraction of the underground structure by the steps of:
(a) presetting a set of 3D seismic data is S(T,M,N), where T is the duration of time, M is the total number of line numbers, and N is the total number of track numbers;
(b) calculating an average Fourier spectrum of several seismic signals from the set of 3D seismic data in the step (a), and selecting a constant frequency value $\eta_0$ for extraction;
(c) processing generalized Chirplet transform with time-synchronized extraction for each seismic signal f(t)=S(T,m,n) of the set of 3D seismic data S(T,M,N) to obtain a time spectrum $TGC_f(\eta,t)$, where $1 \le m \le M$; $1 \le n \le N$ and $S_{TF}(T,m,n)=TGC_f(\eta_0,T)$, which further comprises three sub-steps of: carrying out generalized Chirplet transform on the signals, calculating group delay operator and carrying out time-synchronized extraction,
wherein the generalized Chirplet transform is carried out on the signal f(t) to obtain a time-frequency representation $GC_f(\eta,t)$, where $$GC_f(\eta, t) = \int_{\mathbb{R}} f(\tau)g(\tau - t)e^{-i\frac{\hat{c}(t)}{2}(\tau-t)^2} e^{-i\eta\tau} d\tau,$$

where R represents a set of real numbers, i represents an imaginary unit, g(t) is a window function, ĉ(t) is an optimized Chirp rate, η is a frequency variable, τ is a (integral) time variable, and t is the time variable,
the group delay operator is calculated by:

$$\tilde{t}_f(\eta, t) = -\Im \left\{ \frac{\partial_\eta GC_f(\eta, t)}{GC_f(\eta, t)} \right\},$$

where $\Im\{\cdot\}$ refers to an imaginary part, $\partial_\eta(\cdot)$ refers to a partial derivative with respect to the frequency variable η, and
the time-synchronized extraction is calculated by:

$$TGC_f(\eta,t)=GC_f(\eta,t)\delta(t-\tilde{t}_f(\eta,t)),$$

where a definition of $\delta(t-\tilde{t}_f(\eta,t))$ is:

$$\delta(t - \tilde{t}_f(\eta, t)) = \begin{cases} 1, & t = \tilde{t}_f(\eta, t) \\ 0, & \text{otherwise} \end{cases},$$

(d) obtaining a constant frequency data volume as $S_{TF}(T,M,N)$, and
(e) based on the generalized Chirplet transform, accurately locating a frequency of harmonic signals and a time when an impact signal occurs to obtain a time-frequency characteristic representation of both the harmonic signals and pulse signals for seismic data processing and for seismic time-frequency analysis of the rock structure of the underground structure, (III) applying the seismic time-frquency analysis based on the generalized Chirplet transform with time-synchronized extraction on the underground structure so as to present the time-frequency characteristic representation with both the harmonic signals and pulse signals of the rock structure of the underground structure in a form of an image.

2. The seismic time-frequency analysis method based on the generalized Chirplet transform with time-synchronized extraction according to claim 1, wherein in step (b), comprises the steps of: drawing the time spectrum, observing a main frequency interval of the signals, and selecting a frequency value for extraction in the main frequency interval.

* * * * *